United States Patent
Akavaram et al.

(10) Patent No.: US 12,517,837 B2
(45) Date of Patent: Jan. 6, 2026

(54) LOGICAL TO PHYSICAL LOOKUP TABLE UPDATE IN A FLASH MEMORY SYSTEM

(71) Applicant: QUALCOMM Incorporated, San Diego, CA (US)

(72) Inventors: Santhosh Reddy Akavaram, Hyderabad (IN); Sonali Jabreva, Firozabad (IN); Prakhar Srivastava, Lucknow (IN)

(73) Assignee: Qualcomm Incorporated, San Diego, CA (US)

( * ) Notice: Subject to any disclaimer, the term of this patent is extended or adjusted under 35 U.S.C. 154(b) by 46 days.

(21) Appl. No.: 18/310,295

(22) Filed: May 1, 2023

(65) Prior Publication Data
US 2024/0370378 A1    Nov. 7, 2024

(51) Int. Cl.
*G06F 12/1009* (2016.01)
(52) U.S. Cl.
CPC .............................. *G06F 12/1009* (2013.01)
(58) Field of Classification Search
CPC .................................................. G06F 12/1009
See application file for complete search history.

(56) References Cited

U.S. PATENT DOCUMENTS

| | | | |
|---|---|---|---|
| 2009/0113121 A1 | 4/2009 | Lee et al. | |
| 2016/0132441 A1* | 5/2016 | Styles | G06F 13/1689 710/110 |
| 2017/0235681 A1 | 8/2017 | Kaburaki et al. | |
| 2018/0239726 A1* | 8/2018 | Wang | G06F 12/109 |
| 2019/0013081 A1* | 1/2019 | Blodgett | H04L 9/0861 |
| 2019/0121540 A1 | 4/2019 | Shin et al. | |
| 2019/0272110 A1 | 9/2019 | Shin et al. | |
| 2019/0303299 A1 | 10/2019 | Su | |
| 2020/0042460 A1* | 2/2020 | Oh | G06F 12/0246 |
| 2020/0065259 A1 | 2/2020 | Byun | |
| 2020/0183855 A1 | 6/2020 | Haswell | |
| 2020/0334166 A1* | 10/2020 | Byun | G06F 12/10 |
| 2021/0232503 A1 | 7/2021 | Lieber et al. | |
| 2021/0406187 A1 | 12/2021 | Jean | |
| 2022/0019525 A1* | 1/2022 | Shih | G06F 12/0246 |

OTHER PUBLICATIONS

International Search Report and Written Opinion—PCT/US2024/018523—ISA/EPO—Jul. 16, 2024.

* cited by examiner

*Primary Examiner* — Edward J Dudek, Jr.
*Assistant Examiner* — Ralph A Verderamo, III
(74) *Attorney, Agent, or Firm* — NORTON ROSE FULBRIGHT US LLP

(57) ABSTRACT

This disclosure provides systems, methods, and devices for memory systems that support updating a logical to physical (L2P) table of a host device in accordance with one or more updates to a corresponding L2P table of a memory system. In a first aspect, a method of accessing data in a flash memory system includes a host memory controller receiving an indication of an update to a first logical to physical (L2P) table stored on a first memory of a memory system and updating a second L2P table stored on a second memory of the host device in accordance with the update to the first L2P table. Other aspects and features are also claimed and described.

28 Claims, 12 Drawing Sheets

LOGICAL TO PHYSICAL LOOKUP TABLE UPDATE IN A FLASH MEMORY SYSTEM

TECHNICAL FIELD

Aspects of the present disclosure relate generally to an apparatus and method for controlling a memory device. Some aspects may, more particularly, relate to an apparatus and method for controlling operations for updating a logical to physical (L2P) lookup table stored in a memory of a host device connected to a flash memory.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

One standard for organization and operation of electronic memory devices is the Universal Flash Storage (UFS) standard. The UFS standard was introduced as a successor to the eMMC (embedded MultiMediaCard) standard to offer higher performance and lower power consumption for mobile and other embedded devices. UFS provides support for a range of features such as multi-lane configurations, command queuing, and power-saving modes that enable high-speed data transfer rates, low latency, and long battery life. The UFS standard specifies many parameters for structuring, reading data from, and writing data to UFS-compliant memory devices. For example, UFS-compliant devices may include digital cameras, mobile phones, consumer electronic devices, and other devices with internal memory capacity. UFS-compliant memory may include memory embedded within electronic devices and removable memory cards, and UFS memory devices may implement NAND flash memory.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

When a memory system connected to a host device updates a logical to physical (L2P) table stored on a memory of the memory system, the L2P table stored by the memory system may become out of sync with a corresponding L2P table stored on a memory of the host device. The memory system may transmit, to the host device, an indication that an L2P table stored by the memory system was updated, such as an interrupt indicating that the L2P table stored by the memory system was updated. The host device may then proceed to update the corresponding L2P table stored by the host device to reflect the changes to the L2P table stored by the memory system. Such updating may reduce the occurrence of L2P cache misses that may result from L2P tables on the host device and the memory system that are out of sync. Furthermore, maintaining synchronization of L2P tables stored by the host device and the memory system may enhance read throughputs. Such improvements reduce wait times for a user when the host device is initializing and/or otherwise accessing data stored by the memory system.

In one aspect of the disclosure, a memory device includes a memory controller coupled to a memory module through a first channel and configured to access data stored in the memory module through the first channel; and coupled to a host device through a first interface and configured to communicate with the host device over the first interface. The memory controller of the memory device may be configured to perform operations including updating, by the memory controller, a first logical to physical (L2P) table stored on a first memory of a memory module coupled to the memory controller, setting, by the memory controller, a bit in a second memory of the memory module indicating the update to the first L2P table, and transmitting, to a host device coupled to the memory controller through a first interface, an indication of the update to the first L2P table after setting the bit. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

In an additional aspect of the disclosure, an apparatus includes a memory controller of a host device configured to couple the host device to a memory system through a first interface, the memory controller configured to perform operations including receiving, by the memory controller of the host device, an indication of an update to a first logical to physical (L2P) table stored on a first memory of the memory system and updating, by the memory controller of the host device, a second L2P table stored on a second memory of the host device in accordance with the update to the first L2P table. In another aspect of the disclosure, a method for performing these operations by a processor by executing instructions stored in a memory coupled to the processor is also disclosed. In an additional aspect of the disclosure, a non-transitory computer-readable medium stores instructions that, when executed by a processor, cause the processor to perform these operations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about a in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including techniques for storing, retrieving, and organizing data in a memory system. Aspects of this disclosure provide for operations and data structures used in those operations for updating an L2P table stored on a memory of a host device in accordance with changes to an L2P table stored on a memory of a memory system.

Particular implementations of the subject matter described in this disclosure may be implemented to realize one or more of the following potential advantages or benefits. In some aspects, the present disclosure provides techniques for improved performance of a memory system, such as reduced L2P misses, enhanced read throughput, and reduced loading times from flash memory.

For example, in some cases some operations described herein may be detected through a comparison of an L2P table stored on a memory of a host device following application of an update to an L2P table stored on a memory of a memory system, following an update to the memory of the memory system. If the L2P table stored on the memory of the host device reflects the update to the L2P table stored on the memory of the memory system, then the L2P table of the host device may have been updated in accordance with the update to the L2P table of the memory system. Furthermore, messages between a host device and a memory system may be monitored to detect transmission of indications of updates between the memory system and the host device, as disclosed herein.

Figure 1:
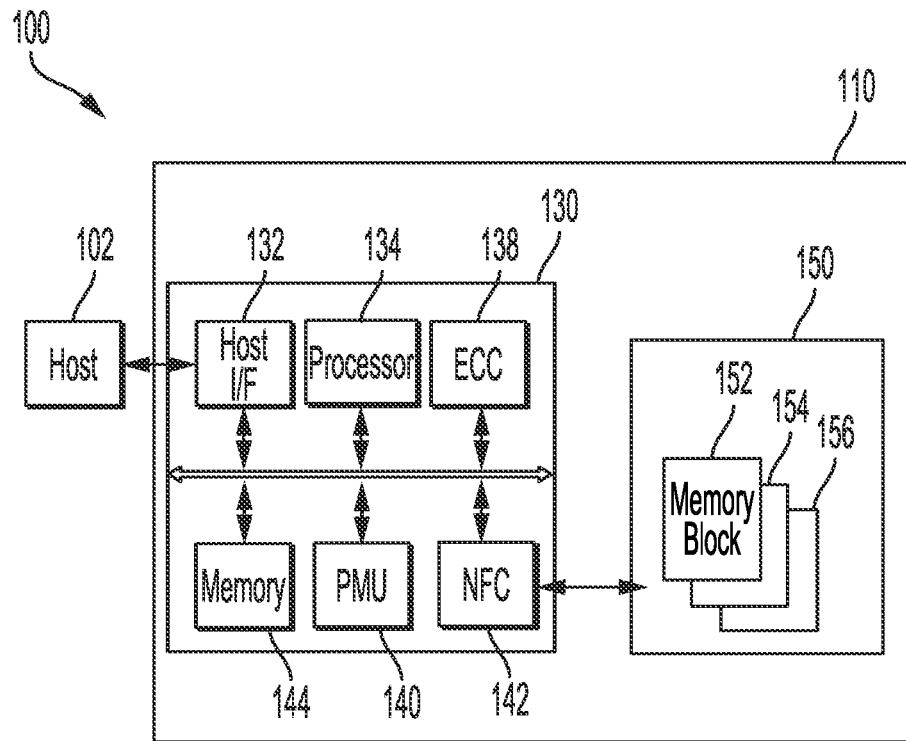
FIG. 1 is a block diagram illustrating a data processing system including a memory system in accordance with an embodiment of the present invention.

Memory may be used in a computing system organized as illustrated in FIG. 1. FIG. 1 illustrates a data processing system 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 6.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multi-media card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (ReRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (POP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host interface unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host interface 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU) or an application-specific integrated circuit (ASIC).

Figure 2:
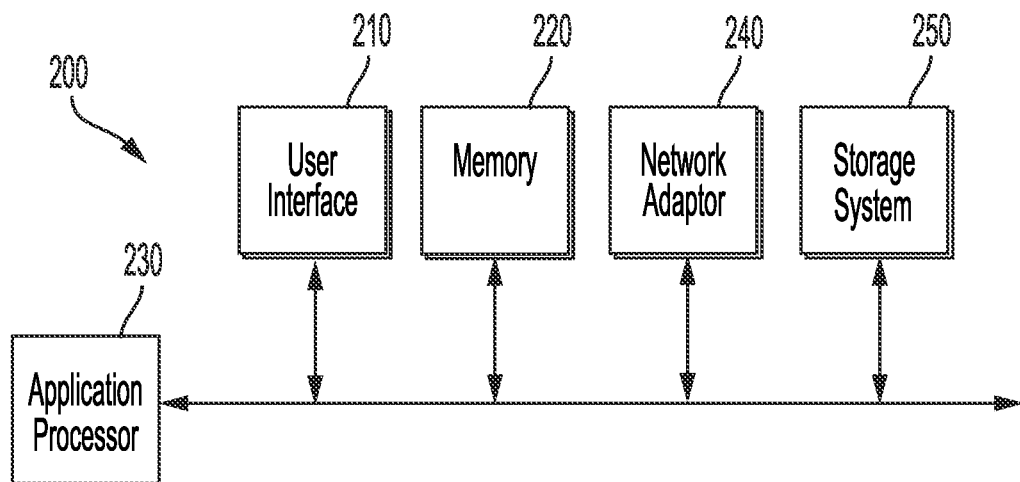
FIG. 2 is a block diagram illustrating an example electronic device including the memory system according to one or more aspects of the disclosure.

FIG. 2 is a block diagram illustrating an example electronic device including the memory system 100 according to one or more aspects of the disclosure. The electronic device 200 may include a user interface 210, a memory 220, an application processor 230, a network adaptor 240, and a storage system 250 (which may be one embodiment of the memory system 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (Re-RAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMOLED) display device, a light emitting diode (LED), a speaker, or a haptic motor.

Figure 3:
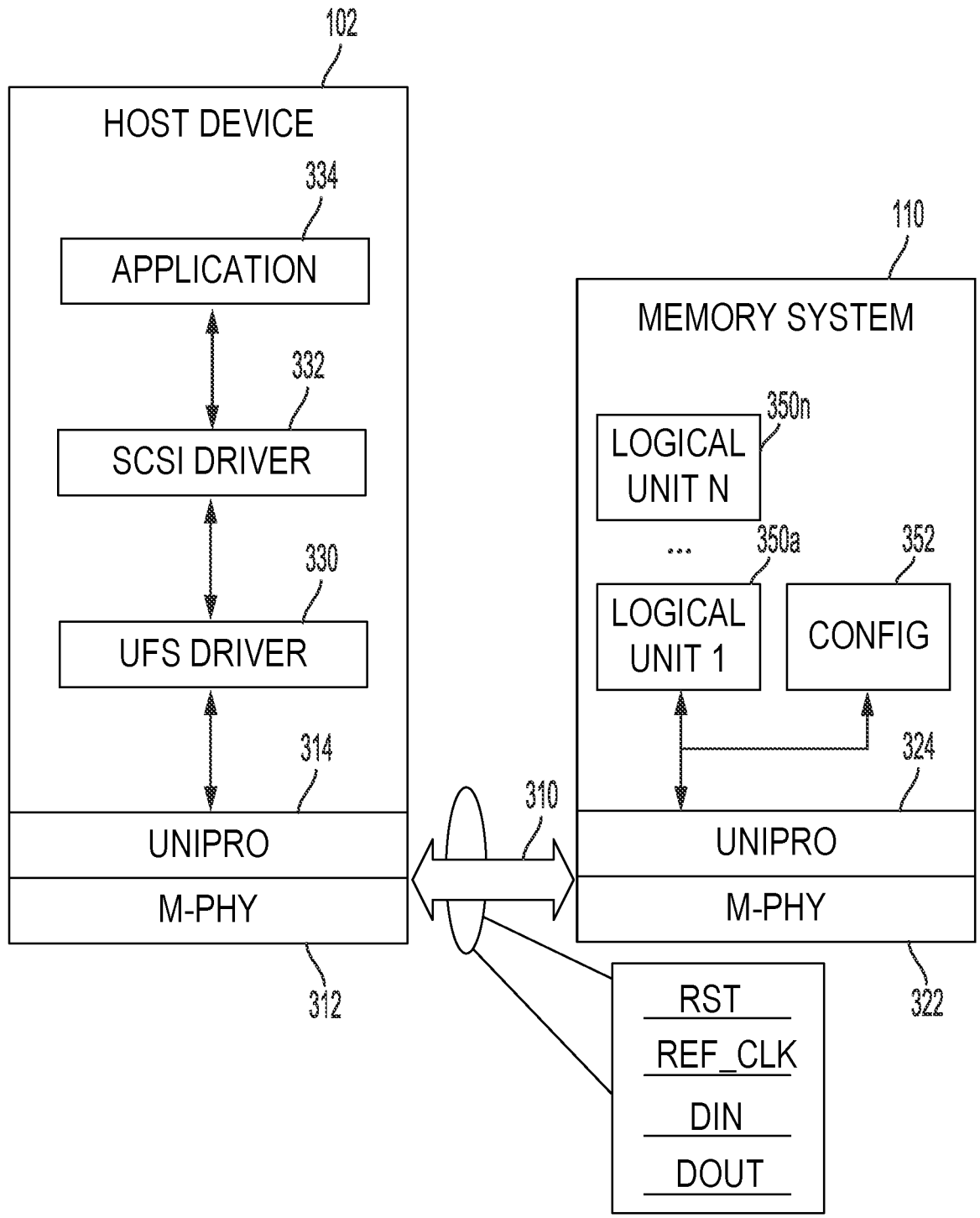
FIG. 3 is a block diagram illustrating components for facilitating access to a flash memory device from a host device according to some embodiments of the disclosure.

FIG. 3 is a block diagram illustrating components for facilitating access to a flash memory system from a host device according to some embodiments of the disclosure. The host device 102 accesses the memory system 110 through the first interface 310. The first interface may, for example, be a physical interface (PHY) connecting the host device 102 to the memory system 110. The host device 102 may include physical layer access block 312, which is configured to generate signals for output to the first interface 310 and process signals received through the first interface 310. The memory system 110 includes a similarly-configured physical layer access block 322 for communicating on the first interface 310. One example physical layer specification for communicating on the first interface 310 is the MIPI M-PHY™ physical layer specification.

The host device 102 also includes a data link layer block 314 configured to format frames of data for transmission on the first interface 310. The frames may be provided to the physical layer access block 312 for transmission. The data link layer block 314 may receive frames from the physical layer access block 312 and decode frames of data received on the first interface 310. The memory system 110 includes a similarly-configured data link layer block 324 for processing frames transmitted on or received on the first interface 310 by the physical layer access block 322. One example data link protocol for communicating on a MIPI M-PHY™ physical link is the MIPI UNIPRO™ specification.

The memory system 110 includes N logical units 350a-n comprising logical memory blocks for storing information including user data (e.g., user documents, application data) and configuration data (e.g., information regarding operation of the memory system 110). The logical units 350a-n may map to portions of the physical memory blocks 152, 154, and 156. Some of the logical units 350a-n or portions of the logical units 350a-n may be configured with write protection, with boot capability, as a specific memory type (e.g., default, system code, non-persistent, enhanced), with priority access, or with replay protection as a replay protected memory block (RPMB). The physical layer access block 322 and the data link layer block 324 perform operations of a memory controller for the memory system 110 for storing and retrieving data in logical units 350a-n.

The memory system 110 may store a logical to physical (L2P) table mapping the logical units 350a-n to physical memory blocks 152, 154, and 156. For example, an L2P table may include one or more entries with each entry identifying a logical unit and a corresponding physical memory block to which the logical unit is mapped. The host device 102 may request mapping information regarding the contents of an L2P table stored by the memory system 110 and may use such information to request information stored in the logical units 350a-n. In some cases, such as when a host device and/or memory system are configured to support host performance booster (HPB) features, a corresponding L2P table may be stored in a memory of the host device 102 to allow the host device 102 more rapid access to the L2P table.

The memory system 110 also includes configuration structures 352. The configuration structures 352 may include information such as configuration descriptors for boot enable (bBootEnable), initial power mode (bInitPowerMode), RPMB active (bRPMBRegionEnable), and/or RPMB region sizes (bRPMBRegion1Size, bRPMBRegion2Size, bRPMBRegion3Size). Such configuration structures and/or parameters may, for example, be configuration structures and/or parameters identified by the UFS standard.

The host device 102 may be configured to execute one or more applications 334, such as user applications executed by an operating system under the control of a user to receive user input and provide information stored in the memory system 110 to the user. The host device 102 may include several components for interfacing the application 334 to the memory system 110 through the first interface 310. For example, a SCSI driver 332 and a UFS driver 330 may interface the application 334 to a host memory controller that includes the data link layer block 314 and the physical layer access block 312. The SCSI driver 332 may execute at an application layer for handling transactions requested by the application 334 with the memory system 110. The UFS driver 330 may execute at a transport layer and manage operation of the data link layer block 314, such as to operate the first interface 310 at one of a plurality of modes of operations. The modes of operations may include two or more gear settings, such as one or more PWM-GEAR settings and four or more HS-GEAR settings specifying one bitrate from 182 MBps, 364 MBps, 728 MBps, and 1457 MBps.

The first interface 310 may include one or more lines including a reset RST line, a reference clock REF_CLK line, a data-in DIN line (for data transmissions from the host device 102 to the memory system 110), and a data-out DOUT line (for data transmissions from the memory system 110 to the host device 102). The DIN and DOUT lines may be two separate conductors, or the DIN and DOUT lines may include multiple conductors. In some embodiments, the DIN and DOUT lines may be asymmetric with the DIN line including N conductors and the DOUT line including M conductors, with N>M or M>N.

The UFS driver 330 may generate and decode packets to carry out transactions requested by the application 334. The packets are transmitted over the first interface 310. The packets may be formatted as UFS Protocol Information Units (UPIUs). In a transaction with the memory system 110, the host device 102 is an initiator and the memory system 110 is a target. The UFS driver 330, based on the type of transaction, may form one of several types of UPIUs for handling SCSI commands, data operations, task management operations, and/or query operations. Each transaction may include one command UPIU, zero or more DATA IN or DATA OUT UPIUs, and a response UPIU. Each UPIU may include a header followed by optional fields depending on the type of UPIU.

One example transaction is a read operation. A read transaction may include the initiator (e.g., host device 102) transmitting a command UPIU for causing the target (e.g., memory system 110) to perform a read operation requested by the application 334. The target provides one or more DATA IN UPIUs in response to the command UPIU, in which the DATA IN UPIUs include the requested data. The read transaction is completed by the target transmitting a Response UPIU.

Another example transaction is a write operation. A write operation may include the initiator (e.g., host device 102) transmitting a command UPIU for causing the target (e.g., memory system 110) to perform a write operation requested by the application 334. The target provides a Ready to Transfer UPIU signaling the initiator to begin transfer of write data. The initiator then transmits one or more DATA OUT UPIUs, which are followed by a Ready to Transfer UPIU signaling the initiator to continue transfer of the write data. The sequence of DATA OUT UPIUs and Ready to Transfer UPIU continues until all write data is provided to the target, after which the target provides a Response UPIU to the initiator.

A further example transaction is a query operation. A query operation may include the initiator (e.g., host device 102) requesting information about the target (e.g., memory system 110). The initiator may transmit a Query Request UPIU to request information such as configuration, enumeration, device descriptor, flags, and/or attributes of the target. Example query operations includes read descriptor, write descriptor, read attribute, write attribute, read flag, set flag, clear flag, and/or toggle flag. Example descriptors include device, configuration, unit, interconnect, string, geometry, power, and/or device health. Example flags include fDeviceInit, fPermanentWPEn, fPowerOnWPEn, fBackgroundOpsEn, fDeviceLifeSpanModeEn, fPurgeEnable, fRefreshEnable, fPhyResourceRemoval, fBusyRTC, and/or fPermanentlyDisableFwUpdate. Example attributes include bBootLunEn, bCurrentPowerMode, bActiveICCLevel, bOutOfORderDataEn, bBackgroundOpStatus, bPurgeStatus, bMaxDataInSize, bMaxDataOutSize, dDynCapNeeded, bRefClkFreq. Such flags may, for example, be flags identified by the UFS standard.

The operations and capabilities described above may be used for a memory system that supports updating an L2P table of a host device based on one or more changes to an L2P table of a memory system. For example, the L2P table of the host device may be updated in response to receipt of an interrupt from the memory system indicating that an L2P table of the memory system has been updated. Such updating may reduce occurrence of L2P cache misses, may enhance read throughput efficiency, and may reduce load times for data.

Figure 4A:
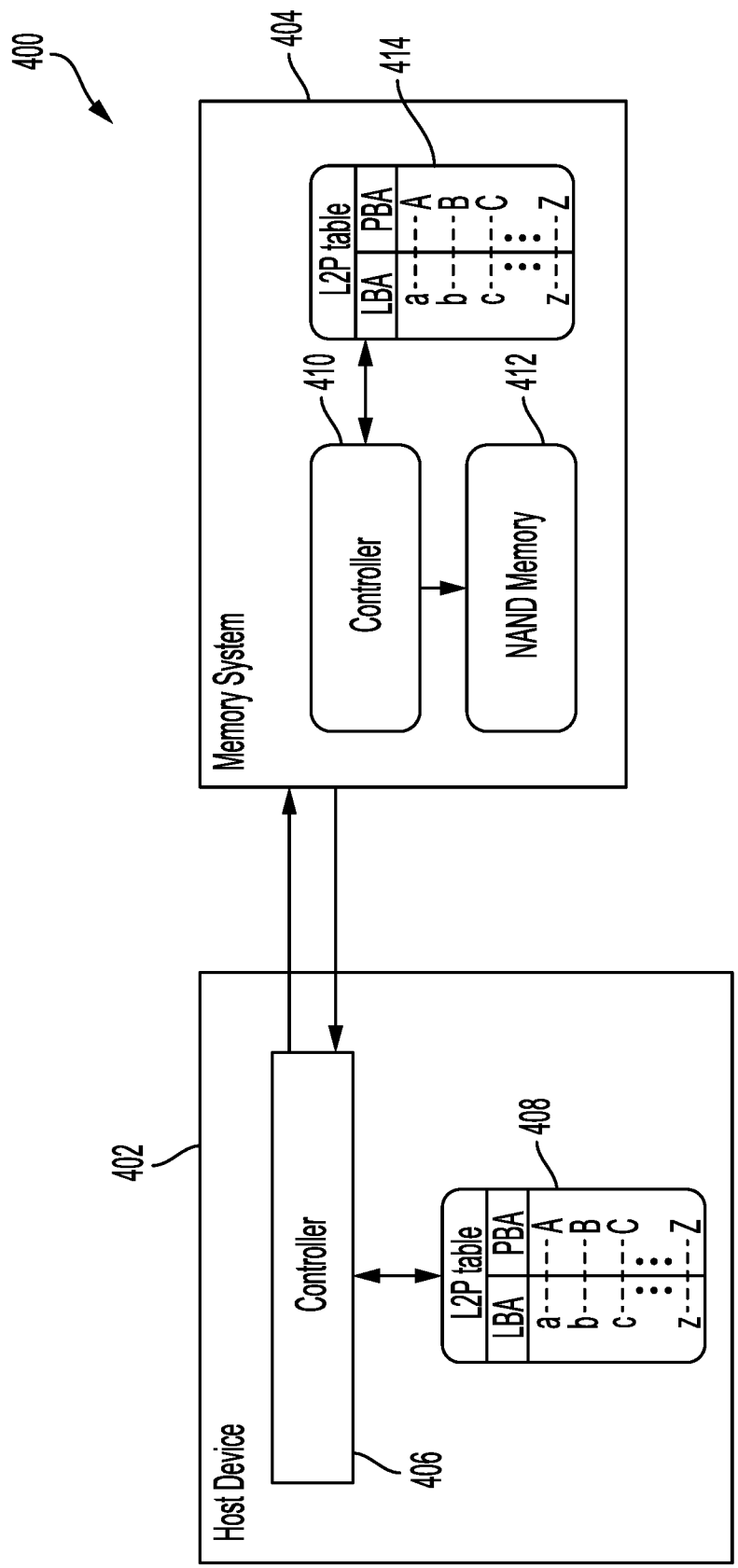
FIG. 4A is a block diagram illustrating corresponding L2P tables in a host device and a memory system that are in sync according to some embodiments of the disclosure.

A host device 402, which may correspond to host device 102, may be connected to a memory system 404, which may correspond to the memory system 110, via one or more lanes, as shown in the block diagram 400 of FIG. 4A. The memory system 404 may include a controller 410, a NAND memory 412, and an L2P table 414. The L2P table 414 may include one or more mappings of logical memory block addresses to physical memory block addresses, such as physical memory block addresses of the NAND memory 412. In some embodiments, the L2P table 414 may be stored in SRAM of the memory system 404, which may be different from the NAND memory 412. In some embodiments, the memory system 404 may be a UFS device. The host device 402 may include a controller 406 and a corresponding L2P table 408. In some embodiments, the controller may include a host controller interface (HCI) layer for facilitating communication between the host device 42 and the memory system 404. The L2P table 408 of the host device may, for example, be stored on a dynamic random access memory of the host device 402. In some embodiments, the host device 402 may be a SoC device.

Figure 4B:
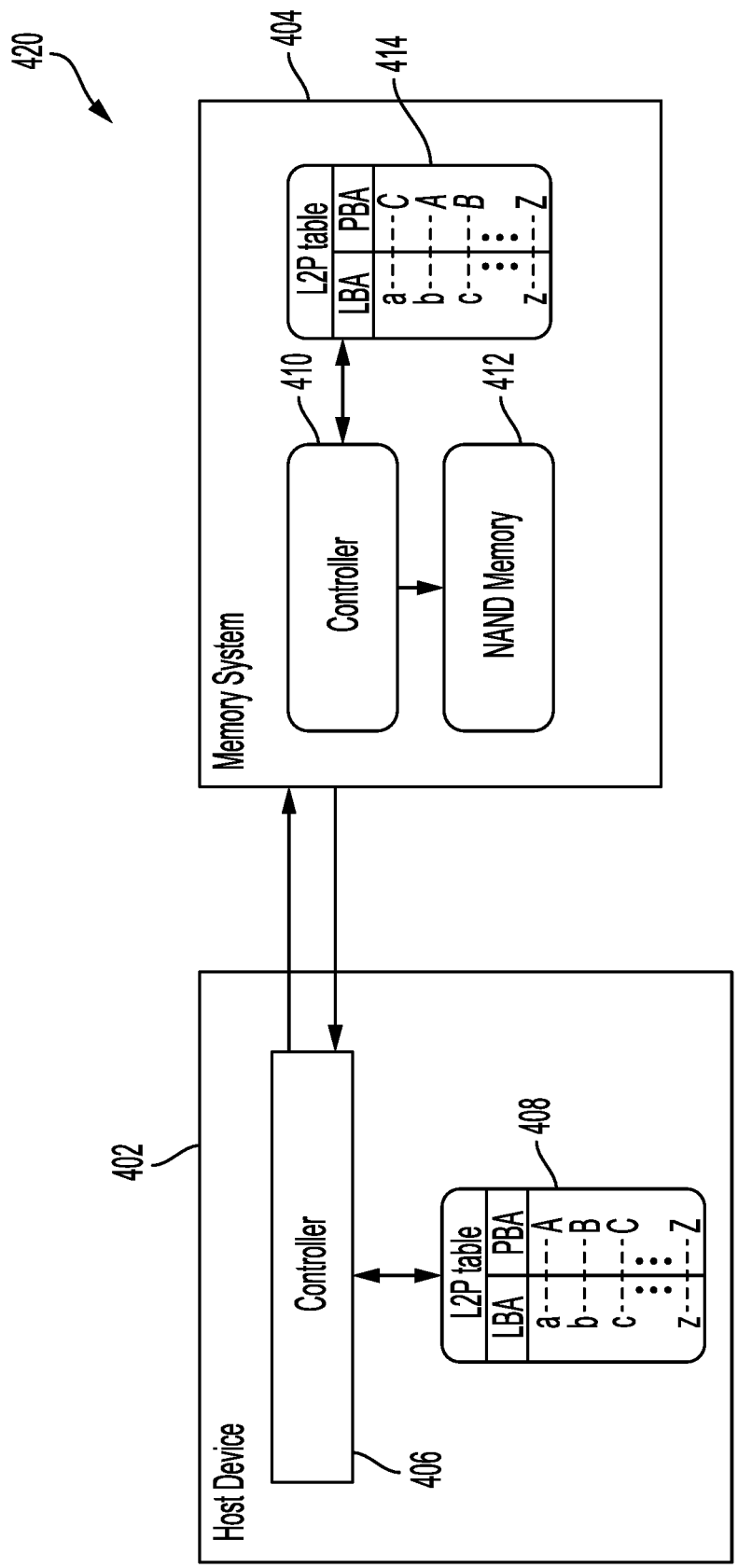
FIG. 4B is a call diagram illustrating corresponding L2P tables in a host device and a memory system that are out of sync according to some embodiments of the disclosure.
Figure 4C:
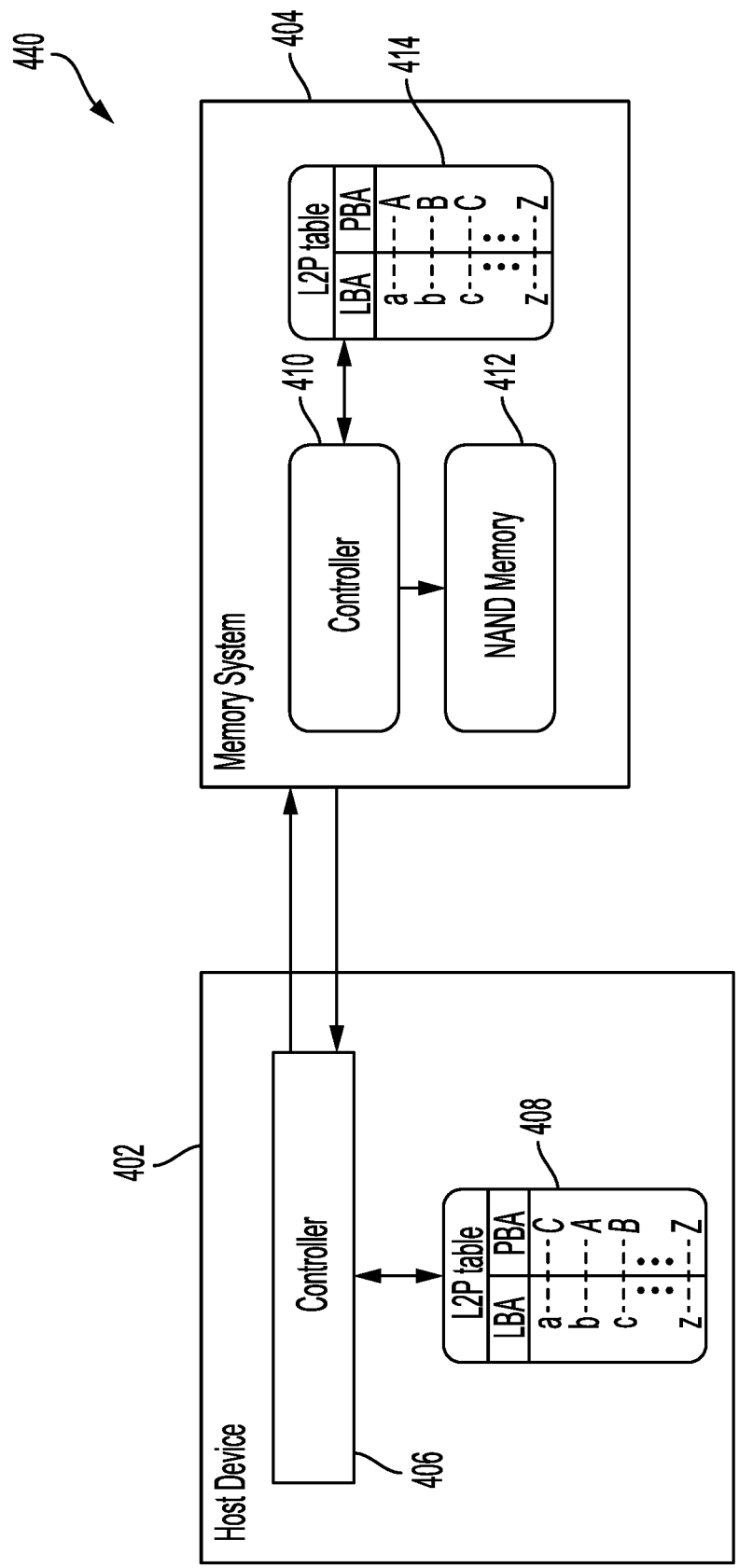
FIG. 4C is a call diagram illustrating corresponding L2P tables in a host device and a memory system that are out of sync according to some embodiments of the disclosure.

The L2P tables stored by the host device 402 and the memory system 404 may be updated for a variety of reasons. An update to an L2P table may include a change in one or more mappings between logical block addresses and physical block addresses of the memory 412. For example, as a memory 412 of the memory system 404 ages, memory blocks of the memory 412 may wear out and/or become otherwise unusable. As memory blocks wear out, other memory blocks may be reallocated to replace such memory blocks. Such replacement may result in a change in a relationship between a logical block address associated with particular data and a physical block address at which the particular data is stored. As another example, data may, in some cases, be moved from certain memory blocks to other memory blocks, such as from one physical address to another physical address, while the memory system 404 is performing management activities in a lower power mode and/or when the memory system 404 is powered on, such as after resuming from a sleep mode, a hibernate mode, or a power down mode. As another example, the memory system 404 may perform wear leveling, to avoid block wear-outs, or garbage collection, to reclaim free space in the memory, changing a relationship between logical block addresses and physical block addresses specified by the L2P table 414. In such cases, the L2P table 414 of the memory system 404 may be updated to reflect changes to data location and/or the reallocation of memory blocks while a corresponding L2P table 408 stored by the host device 402 may not be updated, causing the L2P tables to become out of sync. As another example, one or more resets may be performed on the memory system 404, which may trigger changes to an L2P table 414 stored by the memory system 404 that may not be reflected in a corresponding L2P table 408 stored by the host device 402. In particular, an L2P table 414 stored by the memory system 404 may be updated, as shown in block diagram 420 of FIG. 4B and may become out of sync with the L2P table 408 stored by the host device 402. As another example, an L2P table 408 stored by the host device 402 may be altered by malicious software or kernel defects, which may also cause the L2P tables to become out of sync. In particular, an L2P table 408 stored by the host device 402 may be updated, as shown in block diagram 440 of FIG. 4C and may become out of sync with the L2P table 414 stored by the memory system 404. If the L2P table 408 of the host device 402 becomes out of sync with the L2P table 414 of the memory system 404, the host device 402 may request data from incorrect memory locations, leading to F2P misses and reduced memory efficiency.

Syncing L2P tables between a host device 402 and a memory system 404 may include syncing only active regions of an L2P table between the host device 402 and the memory system 404. Active regions of the L2P table 414 of the memory system 404 may, for example, be regions of the L2P table indicating mappings of logical block addresses to physical block addresses of regions of the NAND memory 412 that are frequently accessed. As one particular example, the host device 402 may store an L2P table 408 specifying relationships between logical block addresses and physical block addresses of the memory 412 for active regions, while the memory system 404 may store a corresponding L2P table 414 specifying relationships between logical block addresses and physical block addresses of the memory 412 for both active and inactive regions. In a device control mode, the memory system 404 may send information indicating active and inactive regions of the L2P table 414 to the host device 402 in a response UFS protocol information unit (UPIU). Thus, in a device control mode the L2P table 408 of the host device may mirror the contents of the L2P table 414 of the memory system 404 for both active and inactive regions. In a host control mode, the memory system 404 may send information indicating an active region of the L2P table 414 to the host device 402. Thus, in a host control mode, the L2P table 408 of the host device may mirror the contents of active regions of the L2P table 414 of the memory system 404. When, for example, the host device requests data associated with an inactive region of the L2P table 414 while in a host control mode, such a request may result in an L2P miss condition. L2P entries associated with the request may be fetched from the memory system 404, after which the read operation may be performed. When an L2P miss occurs, loading L2P information from the memory system 404 may take hundreds of microseconds, increasing latency of the host device 402 and memory system 404. If an L2P table 414 of the memory system 404 is updated without corresponding updates to the L2P table 408 of the host device 402, L2P misses may occur increasing latency in reading data from the memory 412.

The memory system 404 may transmit an indication to the host device 402 that an L2P table 414 of the memory system 404 has been updated to maintain synchronization between the L2P table 408 of the host device 402 and the L2P table 414 of the memory system 404. For example, when the L2P table 414 of the memory system 404 is updated, the memory system 404 may set a bit in a register of the memory system 404, such as a bit in SRAM of the memory system also storing the L2P table 414 or another memory of the memory system 404. Setting the bit may trigger transmission of an interrupt to the host device 402. When the host device 402 receives the interrupt, the host device 402 may request information indicating the updates to the L2P table 414 of the memory system 404 from the memory system 404. The memory system 404 may provide the information indicating the updates to the L2P table 414 of the memory system 404 to the host device 402, and the host device 402 may update the L2P table 408 of the host device 402 in accordance with the updates to the L2P table 414 of the memory system 404.

Figure 5:
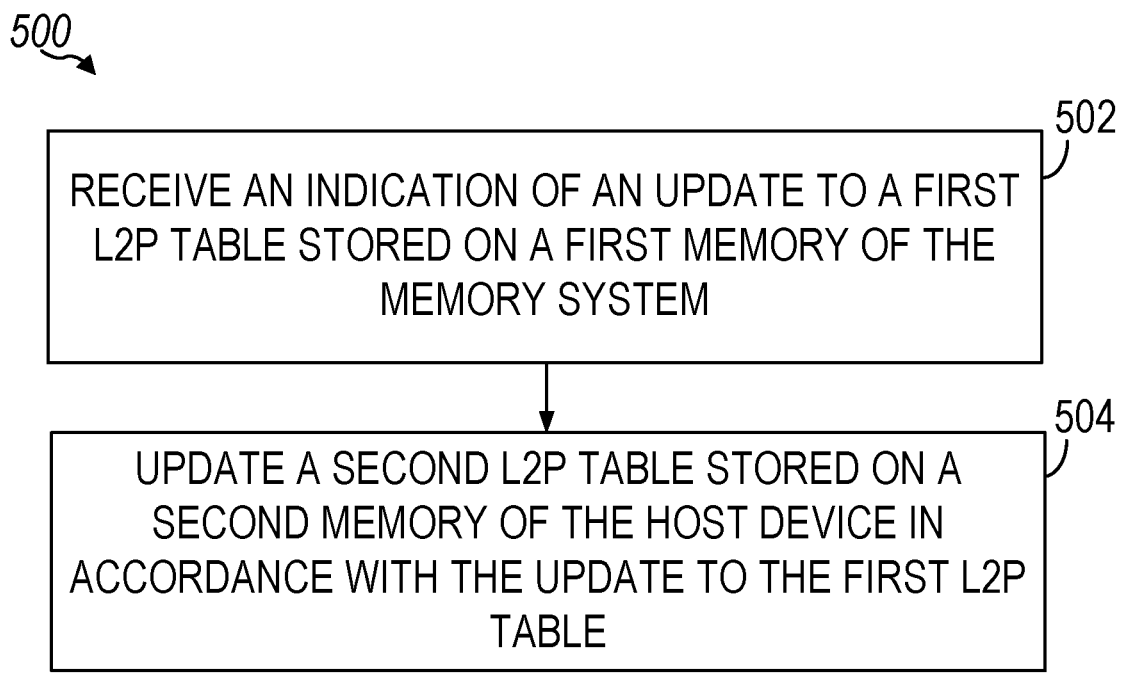
FIG. 5 is flow chart illustrating a method for updating a host device L2P by a host controller according to some embodiments of the disclosure.

FIG. 5 is flow chart illustrating a method 500 for updating an L2P lookup table stored in a memory of a host device by a host controller in accordance with changes to an L2P lookup table stored in a memory of a connected memory system according to some embodiments of the disclosure. The method 500 includes, at block 502, receiving, by the memory controller of a host device, an indication of an update to a first L2P table stored on a first memory of the memory system. Receiving the indication of the update to the first L2P table may include receiving an interrupt from the memory system indicating that an exception event bit corresponding to the update to the first L2P table has been set. The exception event bit may, for example, be a bit, such as an eighth bit, of a wExceptionEventStatus register of a memory of the memory system. The first memory of the memory system may, for example, include a flash memory device configured as a UFS device. In some embodiments, the first memory on which the first L2P lookup table is stored may be SRAM of the memory system. In some embodiments, the exception event bit may be stored in a register of SRAM of the memory system or in another memory of the memory system. In some embodiments, the host device may suspend one or more read requests upon receipt of the indication, until the second L2P table of the host device is updated.

At block 504, the memory controller may update a second L2P table stored on a second memory of the host device in accordance with the update to the first L2P table. For example, the host device may store a second L2P table corresponding to all or part of the first L2P table stored by the memory system to allow for more rapid access to the information of the L2P table by the host device. When the first L2P table of the memory system is updated, the first L2P table may become out of sync with the corresponding second L2P table stored by the host device. Divergence between the two L2P tables may result in L2P misses, where the host device may request information from a logical block indicated as being stored at a particular physical block by the second L2P table of the host device when the data of the logical block is stored at a different physical block as reflected in changes to the first L2P table of the memory system. Thus, in response to a received indication of an update to the first L2P table of the memory system, the host device may update the second L2P table of the host device to reflect one or more changes to the first L2P table of the memory system. In some embodiments, the second memory of the host device on which the second L2P table is stored may be DRAM of the host device.

Updating the second L2P table, at block 504, may include reading one or more entries of the first L2P table from the first memory of the memory system and updating one or more entries of the second L2P table in accordance with the one or more entries of the first L2P table. In some embodiments, the second L2P table of the host device may include L2P information for active regions of the first L2P table of the memory system, and thus changes to L2P entries regarding active regions in the first L2P table may be read by the host device. In some embodiments, updating one or more entries of the second L2P table may include deleting one or more old entries of the second L2P table and replacing such entries with corresponding entries from the updated first L2P table. In some embodiments, updating the second L2P table may include determining a status of a first lane between the host device and the memory system. For example, the host device may be connected to the memory system by a plurality of bidirectional Tx/Rx lanes. The host device may determine that one or more lanes between the host device and the memory system are idle and may utilize the one or more idle lanes for reading the one or more entries of the updated first L2P table from the first memory of the memory system. In some embodiments, the memory controller of the host device may determine which lanes between the host device and the memory system are in an active state, and which lanes are in an idle state. Thus, the memory controller of the host device may determine that a first lane between the host device and the memory system is in an idle state and may read the entries of the first L2P table via the first lane in accordance with the determination that the first lane is in an idle state. In some embodiments, the memory controller of the host device may transmit the entries of the first L2P table via the first lane in accordance with another determination regarding the first lane, such as a determination that the lane is in a semi-idle state or a deactivated state. In some embodiments, after updating the second L2P table, at block 504, the memory controller may read information from the memory system in accordance with the updated second L2P table. For example, the memory controller may request information from the memory system based on one or more entries of the updated second L2P table.

Figure 6:
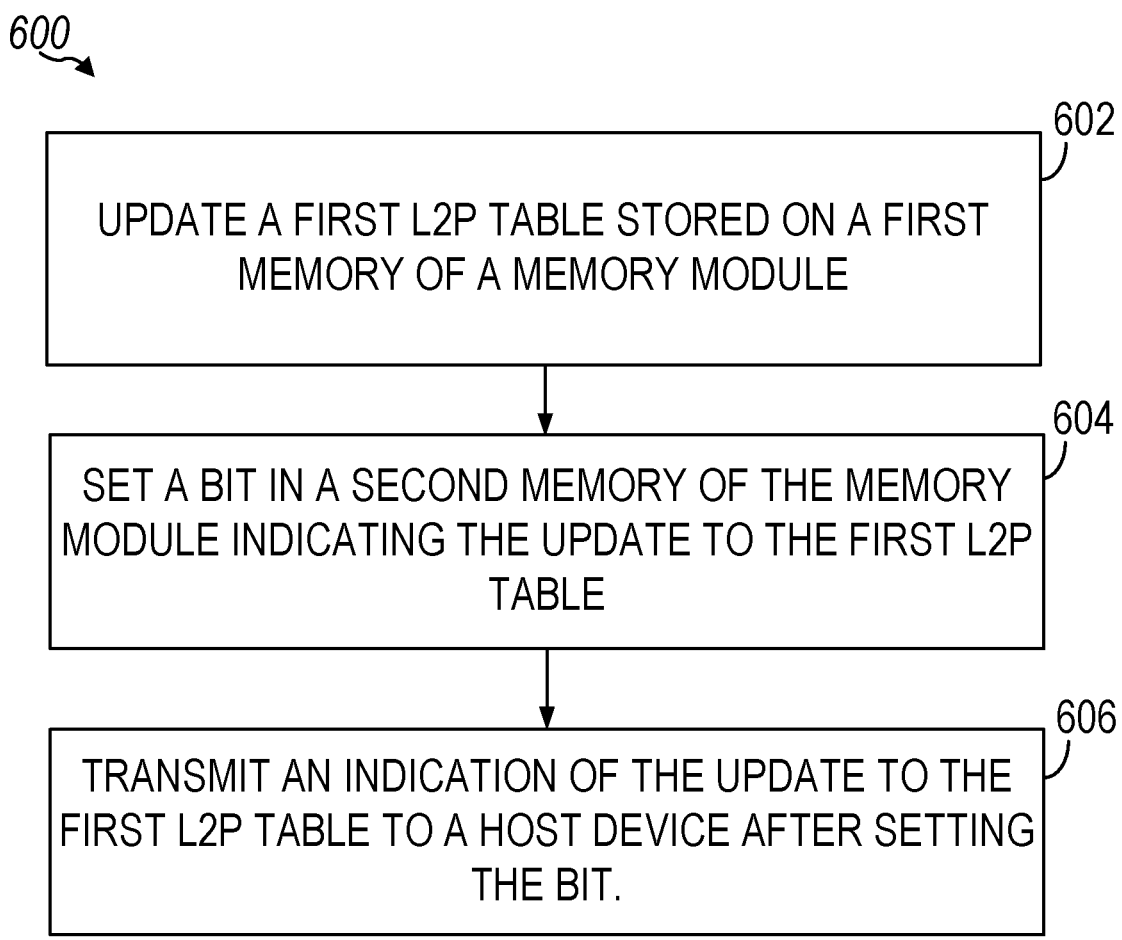
FIG. 6 is a flow chart illustrating a method for triggering updating of a host device L2P table by a flash memory device according to some embodiments of the disclosure.

FIG. 6 is a flow chart illustrating a method for updating an L2P lookup table stored in a memory of a host device in accordance with changes to an L2P lookup table stored in a memory of a connected memory system by the memory system according to some embodiments of the disclosure. A method 600 includes, at block 602 updating a first L2P table stored on a first memory of the memory system, such as a first memory of a memory module of the memory system. In some embodiments, updates to a first L2P table may be triggered, as discussed herein, by reallocation of blocks with new spare blocks to compensate for aging of the memory system, moving of data from one physical address to another during management activities of the memory system, wear leveling, garbage collection, resetting of the memory system, and other events. In some embodiments the first memory of the memory module may include SRAM of the memory system. In some embodiments, the first memory may include a flash memory device configured as a UFS device.

At block 604, the memory system, such as a controller of the memory system, may set a bit in a second memory of the memory module indicating the update to the first L2P table. For example, the memory system may set an L2P bit to 1. The bit may, for example, be an exception event bit, such as an eighth bit of a wExceptionEventStatus register. For example, when the memory system exits a sleep mode or power down mode and enters a pre-active mode, the memory system may set a L2P bit in the exception event register to indicate that the first L2P table of the memory system has been updated. Setting of such a bit may, for example, trigger transmission of an interrupt to a connected host device to cause the host device to update an L2P table of the host device. Thus, setting of such a bit may trigger a synchronization operation between an L2P table of the host device and the L2P table of the memory system. For example, an L2P table of the memory system may be updated, and a bit may be set when the memory system exits a sleep or power down mode, when the memory system is powered on after being in a hibernate mode, when one or more maintenance activities are performed on the memory system causing updates to the first L2P table, or following other events. In some embodiments, if one or more read requests are received by the memory system after the bit is set, the memory system may suspend the read requests until a second L2P table of the host device is updated. In some embodiments, the second memory of the memory module may be a same memory as the first memory of the memory module. In some embodiments, the second memory may include a cache of SRAM of the memory system.

At block 606, the memory system may transmit an indication of the update to the first L2P table to a host device after setting the bit. For example, the indication of the update may be transmitted in response to setting of the bit. In some embodiments, the indication of the update may, for example, be an interrupt indicating that the bit has been set. In some embodiments, after transmitting the indication of the update to the first L2P table, the memory system may receive, from the host device, a read request for reading one or more entries of the updated first L2P table. The memory system may then transmit, to the host device, an indication of the one or more entries to the updated first L2P table. In some embodiments, after transmitting the indication of the update, such as after transmitting an indication of one or more updated entries of the first L2P table to the host device, the memory system may receive, from the host device, a read request for information stored by the memory module. For example, the read request may be a read request in accordance with an updated L2P table of the host device. The memory system may then transmit, after receiving the read request, the information. For example, when the L2P table of the host device is updated in accordance with the update to the L2P table of the memory system, the requested information may be retrieved and transmitted to the host device without an L2P cache miss. In some embodiments, the requested information may, for example, be stored in NAND flash memory of the memory system, which may, in some embodiments, be different from the first memory and/or the second memory. In some embodiments, the exception bit may be reset to 0 after the L2P table of the host device is updated.

Figure 7:
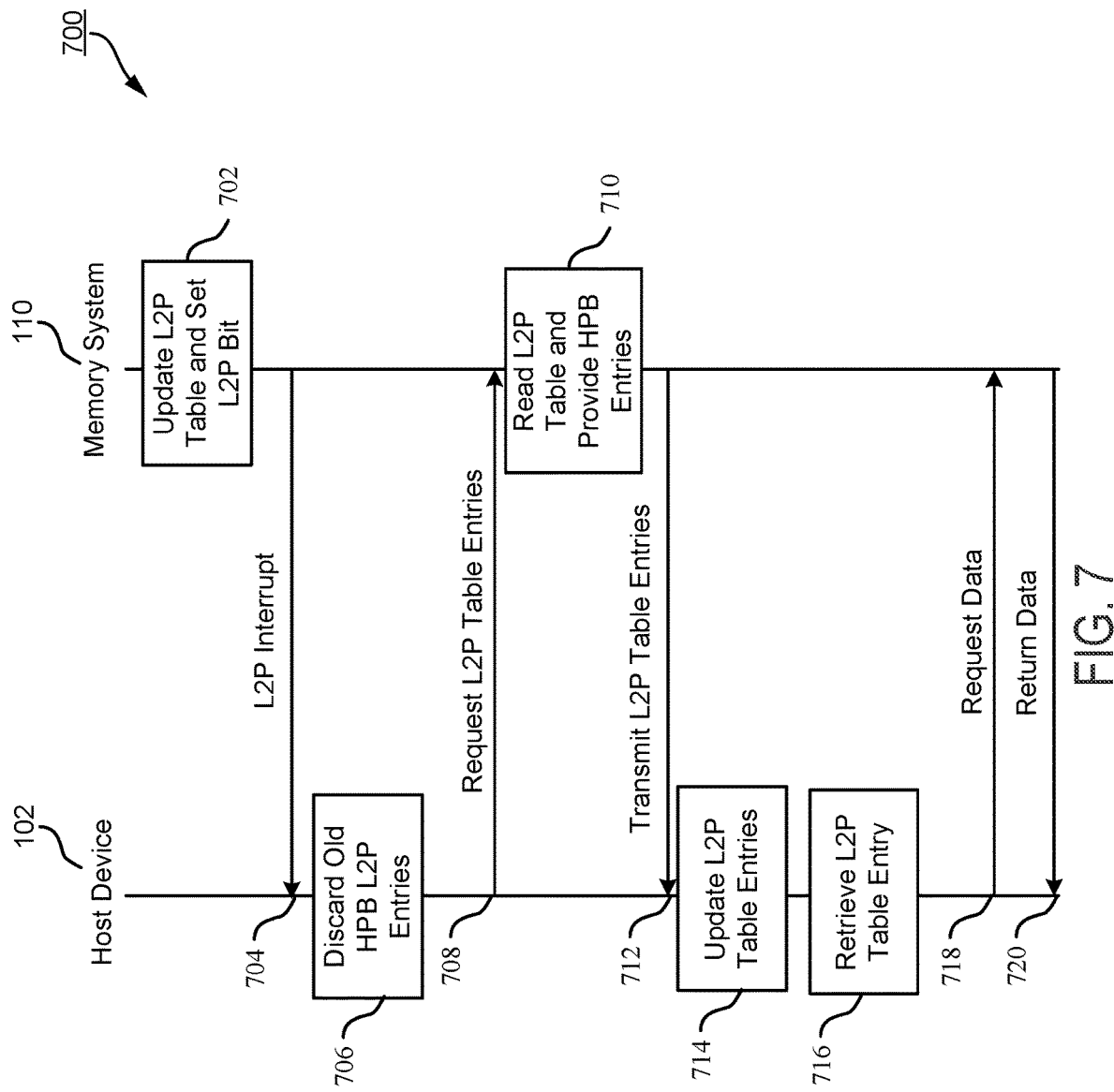
FIG. 7 is a call diagram illustrating a method for updating a host device L2P table according to some embodiments of the disclosure.

An example process flow 700 for updating an L2P table stored by a host device 102 based on updates to an L2P table stored by a memory system 110 is shown in FIG. 7. At block 702, the memory system 110 may update an L2P table and may set an L2P bit, such as an L2P exception bit of a wExceptionEventStatus register. At 704, the memory system 110 may transmit an L2P interrupt to the host device 102. Such an interrupt may, for example, include an indication that the L2P bit has been set to 1. At block 706, the host device may discard entries of the L2P table stored by the host device, such as old HPB L2P table entries. In some embodiments, upon receipt of the L2P interrupt, the host device 102 may suspend one or more read or write operations in a command queue. In some embodiments, the host device 102 may, upon receipt of the L2P interrupt, transfer one or more read or write operations from a command queue to a buffer until the L2P table is updated.

At 708, the host device 102 may transmit a request for one or more updated L2P table entries to the memory system 110. Such a request may, for example, be transmitted in response to receipt of the L2P interrupt. The request may, for example, include an HPB READ BUFFER command request for one or more HPB L2P table entries. In some embodiments, receipt of the request may cause the memory system 110 to reset the L2P bit to 0.

At 710, the memory system 110 may read one or more entries of the updated L2P table of the memory system 110 and may provide one or more HPB entries of the L2P table for transmission to the host device 102. The L2P table may, for example, be referred to as an L2P mapping table. At 712, the memory system 110 may transmit one or more L2P table entries to the host device 102. The host device 102 may then, at 714, update one or more entries of the L2P table stored by the host device based on the L2P table entries received from the memory system 110. For example, the host device 102 may store the one or more L2P table entries received from the memory system 110 in the L2P table of the host device 102.

At block 716, the host device 102 may retrieve an L2P table entry, such as an HPB L2P table entry, from the updated L2P table of the host device 102. The host device 102 may then, at 718, transmit a request for data in accordance with the retrieved updated L2P table entry. The request may, for example, be a request for data of a logical block associated with a particular physical block of a memory of the memory system 110 by the L2P table entry. In some embodiments, the request may include a COMMAND UPIU HPB READ command for reading the data from a memory of the memory system 110. At 720, the memory system 110 may return the requested data to the host device 102. For example, the memory system 110 may fetch the data associated with the updated L2P table entry and may transmit the data to the host device 102 in a RESPONSE UPIU.

Figure 8:
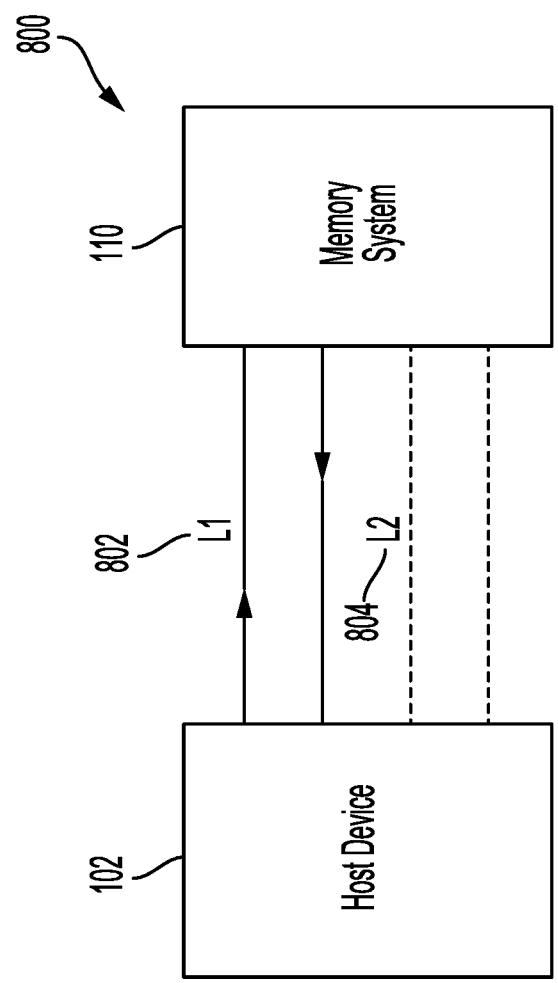
FIG. 8 is a block diagram of communication lanes between a host device and a memory system according to some embodiments of the disclosure.
Figure 8:
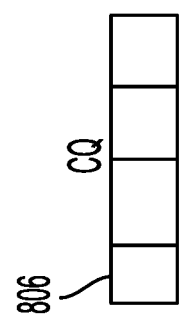

A host device 102 may be connected to a memory system 110 by a plurality of lanes, as shown block diagram 800 of FIG. 8. For example, the host device 102 may be connected to the memory system 110 by a first lane 802 and a second lane 804. In some embodiments, the host device 102 may be connected to the memory system 110 by greater or fewer than two lanes. When the host device 102 receives an indication that an L2P table stored by the memory system has been updated, the host device 102 may determine a status of one or more lanes between the host device 102 and the memory system. For example, the host device 102 may determine that the first lane 802 is active and that the second lane 804 is idle. In some embodiments, the host device may select an idle lane, such as lane 804, for reading L2P table data, such as L2P table entries from the memory system 110. In some embodiments, the host device may train up the idle lane from a low power state to read L2P table entries from the memory system. When the L2P table entries have been read, the host device may return the lane to the lower power state. The host device 102 may include a command queue 806 for storing instructions, such as instructions for reading L2P table data from the memory system 110.

Figure 9:
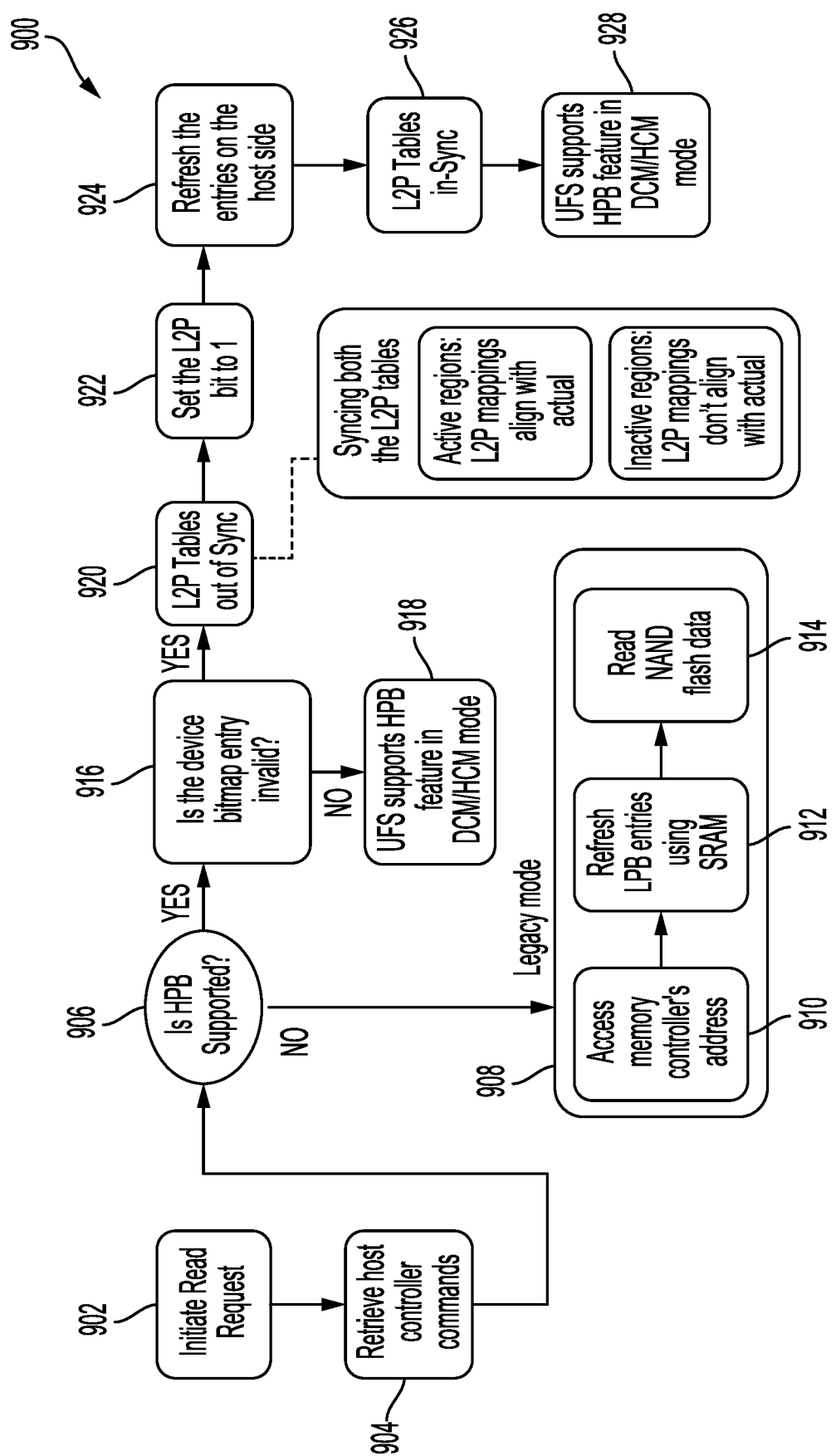
FIG. 9 is a flow chart illustrating a method for accessing data using an L2P table according to some embodiments of the disclosure.

An example flow chart 900 showing a process for requesting data using entries of an L2P table is shown in FIG. 9. At 902, a memory system may receive a read request to read data from a memory system. At block 904, the memory system may retrieve one or more host controller commands, such as one or more commands including a read request from a command queue. At block 906, the memory system may determine whether HPB is supported. For example, the memory system may determine whether an L2P table corresponding to an L2P table stored by the memory system connected to a host device is stored by the host device.

If HPB is determined not to be supported at block 906, the memory system may proceed, at block 908, to operate in legacy mode. At block 910, the memory system may access an address for a memory controller of the memory system. At block 912, the memory system may refresh one or more entries, such as logical physical block (LPB) entries, using SRAM of the memory system. At block 914, the memory system may read data from a NAND flash memory of the memory system.

If HPB is determined to be supported, the memory system may determine, at block 916, whether a device bitmap entry is invalid. For example, the memory system may determine whether corresponding L2P tables of the memory system and host device are out of sync.

If the device bitmap entry is determined to be valid at block 916, the memory system may, at block 920, support HPB features in device controlled mode or host controlled mode, and corresponding L2P tables on the host device and the memory system may be in sync. Thus, in either the device controlled mode or the host controlled mode, in some embodiments both active and inactive regions of the L2P tables may be synced as described at blocks 924-928, while in other embodiments only active regions of the L2P tables may be synced as described at blocks 924-928.

If the device bitmap entry is determined to be invalid at block 916, the memory system may determine, at block 920, that L2P tables stored on the host device and the memory system are out of sync. In some embodiments, such a determination may include a determination that one or more active regions of an L2P table stored on the host device are out of sync with one or more active regions of an L2P table stored on the memory system and/or that one or more inactive regions of an L2P table stored on the host device are out of sync with one or more inactive regions of an L2P table stored on the memory system. Such a determination may, for example, include a determination that one or more entries of an L2P table of the memory system have been updated following a most recent update to corresponding entries of an L2P table of the host device.

At block 922, the memory system may set an L2P bit to 1 to indicate that the L2P tables of the host device and the memory system are out of sync. At block 924, the memory system may refresh L2P table entries on the host side. For example, the memory system may transmit an interrupt to the host device indicating that an update to an L2P table of the host device should be performed. At block 926, after the L2P table of the host device has been updated, the L2P tables of the host device and the memory system may be in sync. At block 928, the memory system may support HPB features in a device controlled mode or a host controlled mode.

Figure 10:
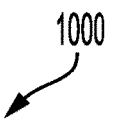
FIG. 10 is a chart showing allocation of bits of an exception event status register according to some embodiments of the disclosure.

An example chart 1000 for a register in which an L2P bit may be stored is shown in FIG. 10. The register may, for example, be a wExceptionEventStatus register. An eighth bit, Bit 7, may be the L2P bit indicating that an L2P table of the host device should be updated. For example, the L2P bit may represent an exception event indicating that an L2P table of the memory system has been updated causing the L2P table of the host device to be out of sync with the L2P table of the memory system.

Figure 11:
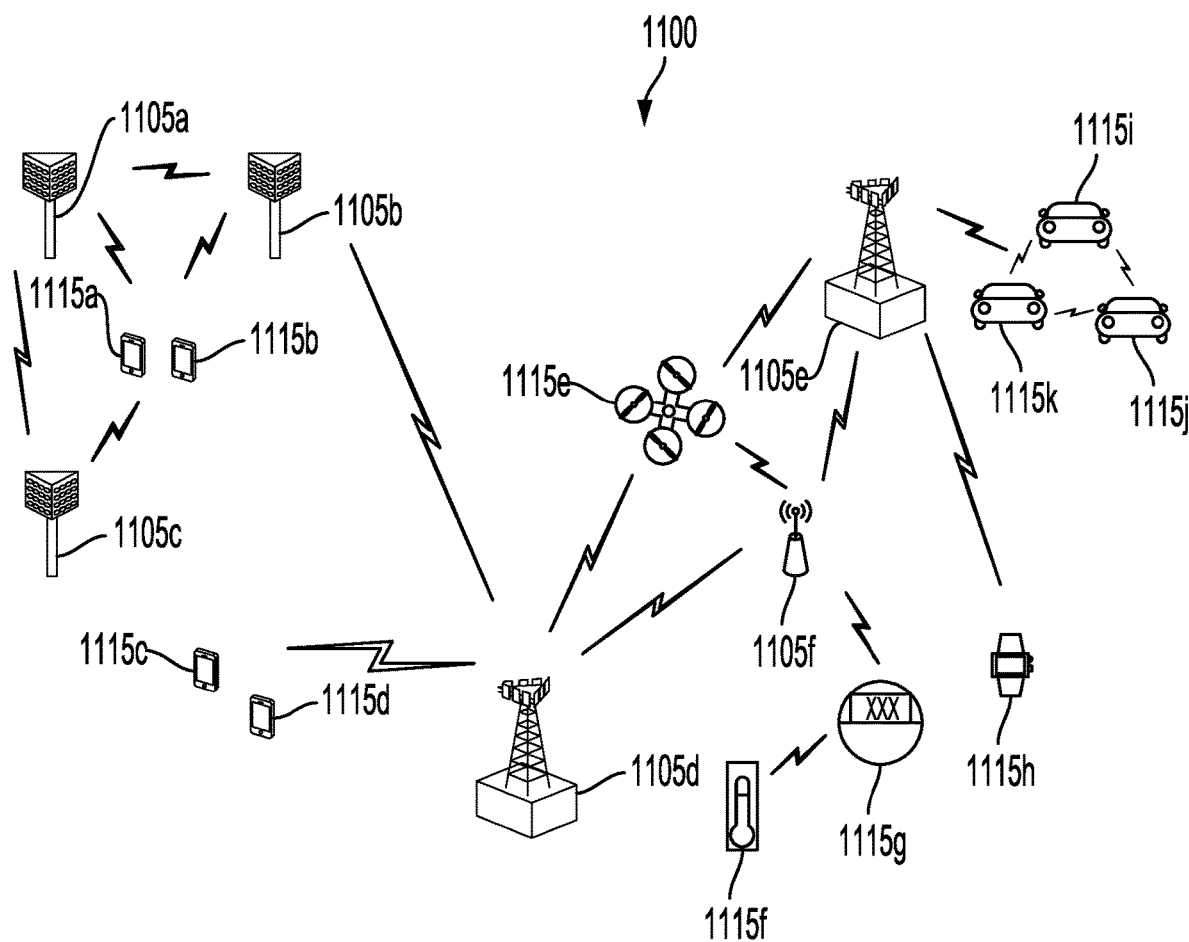
FIG. 11 is a block diagram illustrating details of an example wireless communication system according to one or more aspects.

Operations of method 500, method 600, or process flow 700 may be performed by a UE, such as a UE described with reference to FIG. 11. For example, example operations (also referred to as "blocks") of method 500, method 600, or process flow 700 may enable UE 1115 to support greater user data efficiency. FIG. 11 is a block diagram illustrating details of an example wireless communication system according to one or more aspects. The wireless communication system may include wireless network 1100. Wireless network 1100 may, for example, include a 5G wireless network. As appreciated by those skilled in the art, components appearing in FIG. 11 are likely to have related counterparts in other network arrangements including, for example, cellular-style network arrangements and non-cellular-style-network arrangements (e.g., device to device or peer to peer or ad hoc network arrangements, etc.).

Wireless network 1100 illustrated in FIG. 11 includes a number of base stations 1105 and other network entities. A base station may be a station that communicates with the UEs and may also be referred to as an evolved node B (eNB), a next generation eNB (gNB), an access point, and the like. Each base station 1105 may provide communication coverage for a particular geographic area. In 3GPP, the term "cell" may refer to this particular geographic coverage area of a base station or a base station subsystem serving the coverage area, depending on the context in which the term is used. In implementations of wireless network 1100 herein, base stations 1105 may be associated with a same operator or different operators (e.g., wireless network 1100 may include a plurality of operator wireless networks). Additionally, in implementations of wireless network 1100 herein, base station 1105 may provide wireless communications using one or more of the same frequencies (e.g., one or more frequency bands in licensed spectrum, unlicensed spectrum, or a combination thereof) as a neighboring cell. In some examples, an individual base station 1105 or UE 1115 may be operated by more than one network operating entity. In some other examples, each base station 1105 and UE 1115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 11, base stations 1105d and 1105e are regular macro base stations, while base stations 1105a-1105c are macro base stations enabled with one of 3 dimension (3D), full dimension (FD), or massive MIMO. Base stations 1105a-1105c take advantage of their higher dimension MIMO capabilities to exploit 3D beamforming in both elevation and azimuth beamforming to increase coverage and capacity. Base station 1105f is a small cell base station which may be a home node or portable access point. A base station may support one or multiple (e.g., two, three, four, and the like) cells.

Wireless network 1100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 1115 are dispersed throughout the wireless network 1100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 1115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 1115a-1115d of the implementation illustrated in FIG. 11 are examples of mobile smart phone-type devices accessing wireless network 1100. A UE may also be a machine specifically configured for connected communication, including machine type communication (MTC), enhanced MTC (eMTC), narrowband IoT (NB-IoT) and the like. UEs 1115c-1115k illustrated in FIG. 11 are examples of various machines configured for communication that access wireless network 1100.

A mobile apparatus, such as UEs 1115, may be able to communicate with any type of the base stations, whether macro base stations, pico base stations, femto base stations, relays, and the like. In FIG. 11, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 1100 may occur using wired or wireless communication links.

In operation at wireless network 1100, base stations 1105a-1105c serve UEs 1115a and 1115b using 3D beamforming and coordinated spatial techniques, such as coordinated multipoint (CoMP) or multi-connectivity. Macro base station 1105d performs backhaul communications with base stations 1105a-1105c, as well as small cell, base station 1105f. Macro base station 1105d also transmits multicast services which are subscribed to and received by UEs 1115c and 1115d. Such multicast services may include mobile television or stream video, or may include other services for providing community information, such as weather emergencies or alerts, such as Amber alerts or gray alerts.

Wireless network 1100 of implementations supports mission critical communications with ultra-reliable and redundant links for mission critical devices, such UE 1115e, which is an aeronautical vehicle. Redundant communication links with UE 1115e include from macro base stations 1105d and 1105e, as well as small cell base station 1105f. Other machine type devices, such as UE 1115f (thermometer), UE 1115g (smart meter), and UE 1115h (wearable device) may communicate through wireless network 1100 either directly with base stations, such as small cell base station 1105f, and macro base station 1105c, or in multi-hop configurations by communicating with another user device which relays its information to the network, such as UE 1115f communicating temperature measurement information to the smart meter, UE 1115g, which is then reported to the network through small cell base station 1105f. Wireless network 1100 may also provide additional network efficiency through dynamic, low-latency TDD communications or low-latency FDD communications, such as in a vehicle-to-vehicle (V2V) mesh network between UEs 1115i-1115k communicating with macro base station 1105c.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage and/or data transmission, may include additional aspects, such as any single aspect or any combination of aspects described below or in connection with one or more other processes or devices described elsewhere herein. In a first aspect, an electronic device, such as a UE, may be an apparatus, such as a host device that includes a memory controller configured to couple to a memory system through a first interface, in which the memory system may be integrated with the host device or externally coupled to the host device. The memory system may include a memory controller coupled to a memory system through a first channel and configured to access data stored in the memory system through the first channel and coupled to a host device through a first interface and configured to communicate with the host device over the first interface. Operations performed by the memory controller of the host device may be executed as part of an initialization operation, a read operation or a write operation. A method may also include operations performed by the electronic device described herein.

In the first aspect, the memory controller of the host device may be configured to perform operations including receiving, by the memory controller of the host device, an indication of an update to a first logical to physical (L2P) table stored on a first memory of the memory system and updating, by the memory controller of the host device, a second L2P table stored on a second memory of the host device in accordance with the update to the first L2P table.

In a second aspect, in combination with the first aspect, receiving the indication of the update to the first L2P table comprises receiving an interrupt from the memory system indicating that a bit corresponding to the update to the first L2P table has been set.

In a third aspect, in combination with one or more of the first aspect or the second aspect, updating the second L2P table comprises reading one or more entries of the first L2P table from the first memory of the memory system and updating one or more entries of the second L2P table in accordance with the one or more entries of the first L2P table.

In a fourth aspect, in combination with one or more of the first aspect through the third aspect, updating the second L2P table comprises determining a state of a first lane between the host device and the memory system, wherein reading the one or more entries of the first L2P table from the first memory of the memory system comprises reading the one or more entries of the first L2P table from the first memory of the memory system via the first lane.

In a fifth aspect, in combination with one or more of the first aspect through the fourth aspect, determining the state of the first lane comprises determining that the state of the first lane is an idle state.

In a sixth aspect, in combination with one or more of the first aspect through the fifth aspect, the memory controller of the host device is further configured to perform operations including the memory controller is further configured to perform operations including reading information from the memory system in accordance with the updated second L2P table.

In a seventh aspect, in combination with one or more of the first aspect through the sixth aspect, the second memory of the host device comprises dynamic random access memory (DRAM) of the host device.

In an eighth aspect, in combination with one or more of the first aspect through the seventh aspect, the first memory comprises a flash memory device configured as a universal flash storage (UFS) device.

In a ninth aspect, an apparatus, such as an electronic device, may include a memory controller. The memory controller may be coupled to a memory system, such as to a memory module, through a first channel and configured to access data stored in the memory module through the first channel and coupled to a host device through a first interface and configured to communicate with the host device over the first interface. Operations performed by the memory controller may be executed as part of an initialization operation, a read operation or a write operation. A method may also include operations performed by the electronic device described herein.

In the ninth aspect, the memory controller may be configured to perform operations comprising updating a first logical to physical (L2P) table stored on a first memory of the memory module, setting a bit in a second memory of the memory module indicating the update to the first L2P table, and transmitting, to the host device, an indication of the update to the first L2P table after setting the bit.

In a tenth aspect, in combination with the ninth aspect, transmitting the indication of the update comprises transmitting an interrupt indicating that the bit has been set, wherein the bit comprises a bit.

In an eleventh aspect, in combination with one or more of the ninth aspect through the tenth aspect, the bit is stored in a wExceptionEventStatus register.

In a twelfth aspect, in combination with one or more of the ninth aspect through the eleventh aspect, the memory controller is further configured to perform operations comprising receiving, after transmitting the indication of the update, a read request for reading one or more entries of the updated first L2P table and transmitting, to the host device, an indication of the one or more entries of the updated first L2P table.

In a thirteenth aspect, in combination with one or more of the ninth aspect through the twelfth aspect, the memory controller is further configured to perform operations comprising receiving, from the host device after transmitting the indication of the update, a read request for information stored by the memory module and transmitting, after receiving the read request, the information.

In a fourteenth aspect, in combination with one or more of the ninth aspect through the thirteenth aspect, the first memory of the memory module comprises static random access memory (SRAM) of the memory module.

In a fifteenth aspect, in combination with one or more of the ninth aspect through the fourteenth aspect, the first memory comprises a flash memory device configured as a universal flash storage (UFS) device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 4A-C, 5, or 6 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIG. 4A-C, 5, or 6. Additionally, or alternatively, one or more operations described above with reference to FIGS. 1-3 may be combined with one or more operations described with reference to FIG. 4A-C, 5, or 6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
a memory controller of a host device configured to couple the host device to a memory system through a first interface, the memory controller configured to perform operations including:
receiving, by the memory controller of the host device, an indication of an update to a first logical to physical (L2P) table stored on a first memory of the memory system, wherein receiving the indication of the update to the first L2P table comprises receiving an interrupt from the memory system indicating that a bit corresponding to the update to the first L2P table has been set, wherein the interrupt is triggered by the setting of the bit, and wherein the bit comprises an exception event bit of a wExceptionEventStatus register; and
updating, by the memory controller of the host device, a second L2P table stored on a second memory of the host device in accordance with the update to the first L2P table.

2. The apparatus of claim 1, wherein the bit comprises an eighth bit of the wExceptionEventStatus register.

3. The apparatus of claim 1, wherein updating the second L2P table comprises:
reading one or more entries of the first L2P table from the first memory of the memory system; and
updating one or more entries of the second L2P table in accordance with the one or more entries of the first L2P table.

4. The apparatus of claim 3, wherein updating the second L2P table comprises:
determining a state of a first lane between the host device and the memory system,
wherein reading the one or more entries of the first L2P table from the first memory of the memory system comprises reading the one or more entries of the first L2P table from the first memory of the memory system via the first lane.

5. The apparatus of claim 4, wherein determining the state of the first lane comprises determining that the state of the first lane is an idle state.

6. The apparatus of claim 1, wherein the memory controller is further configured to perform operations including:
reading information from the memory system in accordance with the updated second L2P table.

7. The apparatus of claim 1, wherein the second memory of the host device comprises dynamic random access memory (DRAM) of the host device.

8. The apparatus of claim 1, wherein the first memory comprises a flash memory device configured as a universal flash storage (UFS) device.

9. A method, comprising:
receiving, at a memory controller of a host device, an indication of an update to a first logical to physical (L2P) table stored on a first memory of a memory system, wherein receiving the indication of the update to the first L2P table comprises receiving an interrupt from the memory system indicating that a bit corresponding to the update to the first L2P table has been set, wherein the interrupt is triggered by the setting of the bit, and wherein the bit comprises an exception event bit of a wExceptionEventStatus register; and
updating, by the memory controller of the host device, a second L2P table stored on a second memory of the host device in accordance with the update to the first L2P table.

10. The method of claim 9, wherein the bit comprises an eighth bit of the wExceptionEventStatus register.

11. The method of claim 9, wherein updating the second L2P table comprises:
reading one or more entries of the first L2P table from the first memory of the memory system; and
updating one or more entries of the second L2P table in accordance with the one or more entries of the first L2P table.

12. The method of claim 11, wherein updating the second L2P table comprises:
determining a state of a first lane between the host device and the memory system,
wherein reading the one or more entries of the first L2P table from the first memory of the memory system comprises reading the one or more entries of the first L2P table from the first memory of the memory system via the first lane.

13. The method of claim 12, wherein determining the state of the first lane comprises determining that the state of the first lane is an idle state.

14. The method of claim 9, wherein the memory controller is further configured to perform operations including:
reading information from the memory system in accordance with the updated second L2P table.

15. The method of claim 9, wherein the second memory of the host device comprises dynamic random access memory (DRAM) of the host device.

16. The method of claim 9, wherein the first memory comprises a flash memory device configured as a universal flash storage (UFS) device.

17. An apparatus, comprising:
a memory controller:
coupled to a memory module through a first channel and configured to access data stored in the memory module through the first channel; and
coupled to a host device through a first interface and configured to communicate with the host device over the first interface,
the memory controller configured to perform operations comprising:
updating a first logical to physical (L2P) table stored on a first memory of the memory module;
setting a bit in a second memory of the memory module indicating the update to the first L2P table, wherein the bit comprises an exception event bit of a wExceptionEventStatus register; and
transmitting, to the host device, an indication of the update to the first L2P table after setting the bit, wherein transmitting the indication of the update comprises transmitting an interrupt indicating that the bit has been set, and wherein transmission of the interrupt to the host device is triggered by the setting of the bit.

18. The apparatus of claim 17, wherein the bit comprises an eighth bit of the wExceptionEventStatus register.

19. The apparatus of claim 17, wherein the memory controller is further configured to perform operations comprising:
receiving, after transmitting the indication of the update, a read request for reading one or more entries of the updated first L2P table; and
transmitting, to the host device, an indication of the one or more entries of the updated first L2P table.

20. The apparatus of claim 17, wherein the memory controller is further configured to perform operations comprising:
receiving, from the host device after transmitting the indication of the update, a read request for information stored by the memory module; and
transmitting, after receiving the read request, the information.

21. The apparatus of claim 17, wherein the first memory of the memory module comprises static random access memory (SRAM) of the memory module.

22. The apparatus of claim 17, wherein the first memory comprises a flash memory device configured as a universal flash storage (UFS) device.

23. A method, comprising:
updating, by a memory controller, a first logical to physical (L2P) table stored on a first memory of a memory module coupled to the memory controller;
setting, by the memory controller, a bit in a second memory of the memory module indicating the update to the first L2P table, wherein the bit comprises an exception event bit of a wExceptionEventStatus register; and
transmitting, to a host device coupled to the memory controller through a first interface, an indication of the update to the first L2P table after setting the bit, wherein transmitting the indication of the update comprises transmitting an interrupt indicating that the bit has been set, and wherein transmission of the interrupt to the host device is triggered by the setting of the bit.

24. The method of claim 23, wherein the bit comprises an eighth bit of the wExceptionEventStatus register.

25. The method of claim 23, further comprising:
receiving, after transmitting the indication of the update, a read request for reading one or more entries of the updated first L2P table; and
transmitting, to the host device, an indication of the one or more entries of the updated first L2P table.

26. The method of claim 23, further comprising:
receiving, from the host device after transmitting the indication of the update, a read request for information stored by the memory module; and
transmitting, after receiving the read request, the information.

27. The method of claim 23, wherein the first memory comprises static random access memory (SRAM) of the memory module.

28. The method of claim 23, wherein the first memory comprises a flash memory device configured as a universal flash storage (UFS) device.

\* \* \* \* \*